(12) United States Patent
Nagao et al.

(10) Patent No.: US 7,569,161 B2
(45) Date of Patent: Aug. 4, 2009

(54) ELECTRICALLY CONDUCTING POLYMER AND PRODUCTION METHOD AND USE THEREOF

(75) Inventors: Yuji Nagao, Kanagawa (JP); Ryuji Yamamoto, Kanagawa (JP); Toshio Morita, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 439 days.

(21) Appl. No.: 10/570,140

(22) PCT Filed: Sep. 1, 2004

(86) PCT No.: PCT/JP2004/013011

§ 371 (c)(1),
(2), (4) Date: Mar. 1, 2006

(87) PCT Pub. No.: WO2005/023937

PCT Pub. Date: Mar. 17, 2005

(65) Prior Publication Data

US 2007/0021546 A1     Jan. 25, 2007

Related U.S. Application Data

(60) Provisional application No. 60/500,237, filed on Sep. 5, 2003, provisional application No. 60/546,973, filed on Feb. 24, 2004.

(30) Foreign Application Priority Data

Sep. 2, 2003 (JP) .............................. 2003-309929
Feb. 16, 2004 (JP) .............................. 2004-037676

(51) Int. Cl.
*H01B 1/24* (2006.01)

(52) U.S. Cl. ........................................ 252/511; 252/502

(58) Field of Classification Search ................. 252/502, 252/511
See application file for complete search history.

(56) References Cited

U.S. PATENT DOCUMENTS

| | | | |
|---|---|---|---|
| 5,371,134 A * | 12/1994 | Inoue ........................... | 524/495 |
| 5,475,049 A * | 12/1995 | Ohtomo et al. ............. | 524/449 |
| 5,643,502 A | 7/1997 | Nahass et al. | |
| 5,861,454 A * | 1/1999 | Ikeda et al. .................. | 524/495 |
| 6,344,513 B1 | 2/2002 | Numata | |
| 6,528,572 B1 * | 3/2003 | Patel et al. ................... | 524/495 |
| 6,730,398 B2 * | 5/2004 | Morita et al. ................ | 428/367 |
| 6,844,061 B2 * | 1/2005 | Morita et al. ................ | 428/367 |
| 6,974,627 B2 * | 12/2005 | Morita et al. ................ | 428/367 |
| 7,122,132 B2 * | 10/2006 | Morita et al. ................ | 252/502 |
| 7,150,840 B2 * | 12/2006 | Yamamoto et al. .......... | 252/500 |
| 7,390,593 B2 * | 6/2008 | Yamamoto et al. ......... | 429/231.8 |
| 2002/0146562 A1 * | 10/2002 | Morita et al. ................ | 428/375 |
| 2002/0183438 A1 | 12/2002 | Amarasekera et al. | |
| 2004/0136895 A1 * | 7/2004 | Muramaki et al. ......... | 423/447.3 |
| 2006/0035081 A1 | 2/2006 | Morita et al. | |
| 2007/0181855 A1 | 8/2007 | Nagao et al. | |
| 2007/0200098 A1 | 8/2007 | Nagao et al. | |
| 2008/0075953 A1 | 3/2008 | Nagao et al. | |
| 2008/0099732 A1 | 5/2008 | Nagao et al. | |

FOREIGN PATENT DOCUMENTS

| | | |
|---|---|---|
| EP | 0 337 487 A1 | 10/1989 |
| JP | 01-263156 A | 10/1989 |
| JP | 02-201811 A | 8/1990 |
| JP | 02-212370 A | 8/1990 |
| JP | 2000-248186 A | 9/2000 |
| JP | 2001-200096 A | 7/2001 |
| JP | 2004/143652 A | 5/2004 |
| WO | WO 02/49412 A1 | 6/2002 |
| WO | WO 03/002789 A1 * | 1/2003 |
| WO | WO 03/014441 A1 * | 2/2003 |
| WO | WO 03/027368 A1 * | 4/2003 |
| WO | WO 03/040445 A1 * | 5/2003 |
| WO | 2004/059663 A1 | 7/2004 |

OTHER PUBLICATIONS

GE Melt Viscosity, Intertek Plastics Technology Laboratories, 2009, pp. 1 and 2.*

* cited by examiner

*Primary Examiner*—Douglas Mc Ginty
(74) *Attorney, Agent, or Firm*—Sughrue Mion, PLLC

(57) ABSTRACT

The invention provides a production method of a conductive polymer, comprising a step of blending a polymer in a state of a melt viscosity of 600 Pa·s or less at a shear rate of $100\ s^{-1}$ with a vapor grown carbon fiber in 1 to 15 mass at a mixing energy of 1,000 $mJ/m^3$ or less, and a conductive polymer obtained thereby. Preferably, a vapor grown carbon fiber used has an outer fiber diameter of 80 to 500 nm, an aspect ratio of 40 to 1,000, a BET specific surface area of 4: to 30 $m^2/g$, a do02 of 0.345 nm or less according to an X-ray diffraction method, and a ratio (Id/Ig) of 0.1 to 2 wherein Id and Ig each represent peak heights of a band ranging from 1,341 to 1,349 $cm^{-1}$ and a band ranging from 1,570 to 1,578 $cm^{-1}$ respectively, according to a Raman scattering spectrum. According to the invention, an excellent conductivity can be attained by compounding vapor grown carbon fiber in a smaller amount than in a conventional method.

15 Claims, No Drawings

ELECTRICALLY CONDUCTING POLYMER AND PRODUCTION METHOD AND USE THEREOF

CROSS-REFERENCE TO RELATED APPLICATIONS

This is an application filed pursuant to 35 U.S.C. Section 111(a) with claiming the benefit of U.S. provisional application Ser. No. 60/500,237 filed Sep. 5, 2003 and U.S. provisional application Ser. No. 60/546,973 filed Feb. 24, 2004 under the provision of 35 U.S.C. 111(b), pursuant to 35 U.S.C. Section 119(e)(1).

TECHNICAL FIELD

The present invention relates to a production method of an electrically conductive polymer using vapor grown carbon fiber as a conductive filler, more specifically to a production method of an electrically conductive polymer having vapor grown carbon fiber compounded therein in a smaller amount but exhibiting an electric conductivity which is as high as or higher than conventional electrically conductive polymers. Also, the present invention relates to an electrically conductive polymer produced by the method excellent in mechanical strength and conductivity, and to use of the polymer.

BACKGROUND ART

Conventionally, blending a thermoplastic resin, which per se is electrically insulative, with a conductive filler is a long-known technique for imparting characteristics such as conductivity and antistatic property to the resin, and therefore, a variety of conductive fillers are employed for this purpose.

When a conductive substance is incorporated into resin or rubber which is generally an insulator, for the purpose of imparting conductivity, a phenomenon is observed that the conductivity, which only gradually increases as the filling amount of the conductive substance increases, drastically increases at the point when the filling amount reaches a critical amount and then again gradually increases, so-called "percolation", a characteristic transition from an insulator to a conductor. It is explained that a three-dimensional network formed in the insulator matrix by an electric conductor causes the phenomenon. The critical amount is called "percolation threshold value" (hereinafter referred to simply as "threshold value"). The threshold value is known to virtually depend on the type of the resin serving as a matrix and the type of the conductor.

Examples of generally employed conductive fillers include carbonaceous materials having graphite structure such as carbon black, graphite, vapor grown carbon fiber (hereinafter abbreviated as "CF"), and carbon fiber; metallic materials such as metallic fiber, metallic powder, and metal foil; metal oxides; and metal-coated inorganic fillers. Among them, in order to attain high conductivity through incorporation of a small amount of conductive filler, use of carbon black or hollow carbon fibrils has been encouraged.

However, when the amount of conductive filler is increased so as to attain high conductivity, melt fluidity of the aforementioned resin composition decreases, leading to difficulty in molding and readily causing short shot. Even when molding is completed, molded products assume poor surface appearance. In addition, unsatisfactory molded products (exhibiting variation in mass per shot or poor mechanical property such as impact strength) may be produced. Thus, in order to enhance conductivity obtained through addition of a small amount of conductive filler, enhancement of conductivity of filler itself has been studied (see, for example, Japanese Patent Application Laid-Open No. 2001-200096).

In an attempt to lower the threshold value, at which conductivity becomes high and stable through incorporation of a small amount of conductive filler by virtue of formation of a conductive network formed by the conductive filler in the conductive resin composition, mainly the following three approaches have been studied.

i) Studies on Effects by Shape of Conductive Filler

The studies have elucidated that the threshold value can be lowered through reduction of dimensions of conductive filler, increase in aspect ratio of the filler or increase in surface area of the filler.

ii) Studies on a Technique of Blending Polymers

With respect to a blended resin having a sea-island structure or a mutually continuous structure in the microscopic configuration, there has been proposed a method for forming a carbon black-matrix resin composite by incorporating carbon black uniformly into the sea phase (i.e., matrix phase or continuous phase) resin compatible with carbon black at high concentration and high density (see, for example, Japanese Patent Application Laid-Open No. 02-201811).

Another method has been proposed for forming a CF-matrix resin composite by incorporating CF uniformly into the sea phase (i.e., matrix phase or continuous phase) resin compatible to CF at high concentration and density (see, for example, Japanese Patent Application Laid-Open No. 01-263156).

iii) An Approach in which the Threshold Value is Lowered by Elevating Interfacial Energy It has been elucidated that in a composite composition of any of various resins and carbon black, the larger the interfacial energy, the smaller the threshold value (e.g., in a case of polypropylene/carbon black where the interfacial energy is higher than a case of nylon/carbon black, the threshold value is lower). When carbon black is employed as a conductive filler, there has been made an attempt to elevate interfacial energy between carbon black and resin by elevating surface energy of carbon black through oxidation treatment.

The aforementioned studies have been extensively carried out, to thereby steadily lower the threshold value through elevation of conductivity of conductive filler, by means of the polymer blending method, and other means. However, the polymer blending method cannot be applied in the case where a change in intrinsic properties of a starting material caused by blending of polymers is not acceptable. When shape of conductive filler is fined or the aspect ratio or the surface area of the filler is increased, fluidity of the resin composition during molding is impaired. The effect of the method for lowering the threshold value by elevating the interfacial energy is not very remarkable. In this way, there still remain problems such as deterioration of physical properties, lowering of fluidity during molding, poor appearance of molded products, in attaining high conductivity of a resin composition including a single resin system.

Specifically, the commercial demand for reducing adhesion of dust on electric/electronic components to the minimum has been increasing and more and more intensive year by year, along with the progress on technology for downsizing, integration and precision in office automation (OA) apparatus and electronic apparatus.

For example, such a demand is even more prominent there in the fields of IC chips used in semiconductor elements, wafers, interior parts employed in computer hard disks, etc., and adhesion of dust on these parts must be completely prevented by imparting antistatic properties to the parts. For such applications, there has been employed, as a conductive resin composition, a polymer alloy predominantly containing polycarbonate resin (blend of polycarbonate resin with ABS resin) or a polymer alloy predominantly containing polyphenylene ether resin (blend of polyphenylene ether resin with polystyrene resin), into which a conductive filler such as carbon black is incorporated. In order to attain high conductivity, a large amount of carbon black must be incorporated into a resin, resulting in a problem that the mechanical strength and fluidity of conductive resin are lowered.

With respect to automobile outer parts, "electrostatic coating" is applied where a coating having an opposite charge added thereto is sprayed to a conductivity-imparted resin molded product while electrifying the molded product. In the electrostatic coating method, adhesion of the coating onto the surface of molded products is enhanced on the basis of attractive force between the charge on the surface and the opposite charge in the coating. Many exterior panels and parts of automobiles are formed of a polycarbonate resin-polyester resin blend or a polyphenylene ether-polyamide resin blend. When a conductive filler is incorporated into these molding resin materials for imparting conductivity, mechanical strength and fluidity thereof problematically decrease.

DISCLOSURE OF THE INVENTION

An object of the present invention is to provide a production method for a conductive polymer which attains conductivity equal to or higher than that of a conventional conductive polymer, through employment of vapor grown carbon fiber as a conductive filler and incorporation of the conductive filler in an amount smaller than a conventionally employed amount so that mechanical strength may be maintained and the viscosity at the time of kneading may be prevented from increasing, a conductive polymer obtained by the method and uses of the polymer.

The present inventors have found out that, in order to obtain electric conductivity which is as high as or higher than that of conventional polymer with a compounding amount of vapor grown carbon fiber smaller than in conventional methods, it is important to blend a polymer with carbon fiber by using a low blending energy under a condition that the polymer exhibits a melt viscosity under a given value, and have completed the present invention based on this finding.

Accordingly, the present invention provides a conductive polymer, and a method for producing the polymer.

1. A method for producing a conductive polymer, comprising a step of blending a polymer in a state of a melt viscosity of 600 Pa·s or less at a shear rate of 100 s$^{-1}$ with a vapor grown carbon fiber in an amount of 1 to 15 mass %, at a mixing energy of 1,000 mJ/m$^3$ or less.

2. The method for producing a conductive polymer as described in 1 above, wherein the polymer is an uncured thermosetting polymer in a state of a melt viscosity of 200 Pa·s or less at a shear rate of 100 s$^{-1}$ and the blending is performed at a mixing energy of 400 mJ/m$^3$ or less.

3. The method for producing a conductive polymer as described in 1 above, wherein the polymer is a thermoplastic polymer in a state of a melt viscosity of 200 to 600 Pa·s at a shear rate of 100 s$^{-1}$ and the blending is performed at a mixing energy of 200 to 1,000 mJ/m$^3$.

4. The method for producing a conductive polymer as described in any one of 1 to 3 above, wherein the vapor grown carbon fiber has an outer fiber diameter of 80 to 500 nm, an aspect ratio of 40 to 1,000, a BET specific surface area of 4 to 30 m$^2$/g, a $d_{002}$ of 0.345 nm or less as obtained through an X-ray diffraction method, and a ratio (Id/Ig) of 0.1 to 2, wherein Id represents a peak height of a band ranging from 1,341 to 1,349 cm$^{-1}$ and Ig represents a peak height of a band ranging from 1,570 to 1,578 cm$^{-1}$, as observed in a Raman scattering spectrum.

5. The method for producing a conductive polymer as described in any one of 1 to 4 above, wherein the vapor grown carbon fiber has been heat-treated at 2,000 to 3,500° C. in an inert atmosphere.

6. The method for producing a conductive polymer as described in any of 1 to 5 above, wherein the vapor grown carbon fiber has a surface energy of 115 mJ/m$^2$ or less.

7. The method for producing a conductive polymer as described in 6 above, wherein the vapor grown carbon fiber has been subjected to treatment for lowering the surface energy by wet- or dry-method.

8. The method for producing a conductive polymer as described in 7 above, wherein the treatment for lowering the surface energy is fluorination treatment, boron addition treatment or silylation treatment.

9 The method for producing a conductive polymer as described in 2 above, wherein the thermosetting polymer is selected from the group consisting of polyether, polyester, polyimide, polysulfone, epoxy resin, unsaturated polyester resin, phenol resin, urethane resin, urea resin and melamine resin.

10 The method for producing a conductive polymer as described in 3 above, wherein the thermoplastic polymer is selected from the group consisting of polyamide, polyester, liquid crystal polymer, polyethylene, polypropylene, polyphenylene sulfide and polystyrene.

11. A method for producing a conductive polymer, comprising a step of blending a polymer in a state of a melt viscosity of 600 Pa·s or less at a shear rate of 100 s$^{-1}$ with a vapor grown carbon fiber having a surface energy of 115 mJ/m$^2$ or less.

12. The method for producing a conductive polymer as described in 11 above, wherein the polymer is at least one selected from thermoplastic resins and thermosetting resins being in uncured state.

13. The method for producing a conductive polymer as described in 11 or 12 above, wherein the vapor grown carbon fiber has been subjected to treatment for lowering the surface energy by wet- or dry-method.

14. The method for producing a conductive polymer as described in any one of 11 to 13 above, wherein the vapor grown carbon fiber has an average fiber diameter of 5 μm or less.

15. The method for producing a conductive polymer as described in 13 above, wherein the treatment for lowering the surface energy is fluorination treatment, boron addition treatment or silylation treatment.

16. A conductive polymer, obtained by the production method described in any one of 1 to 15 above.

17. A molded article consisting of conductive polymer obtained by the production method described in any one of 1 to 15 above.

18. An exterior equipment for automobile, using conductive polymer obtained by the production method described in any one of 1 to 15 above.

19. An electromagnetic wave shielding material using conductive polymer produced by obtained by the production method described in any one of 1 or 15 above.

20. An antistatic material employing a conductive polymer obtained by the production method described in any one of 1 or 15 above.

21. A conductive adhesive material using a conductive polymer obtained by the production method described in any one of 1 or 15 above.

DETAILED DESCRIPTION OF THE INVENTION

The present invention will next be described in more detail.

The vapor grown carbon fiber employed in the present invention may be produced through thermal decomposition of an organic compound in the presence of an organic transition metal compound.

Examples of the organic compound which can be employed as a raw material for producing vapor grown carbon fiber include, in the gas form, toluene, benzene, naphthalene, ethylene, acetylene, ethane, natural gas, carbon monoxide, and mixtures thereof. Of these, aromatic hydrocarbons such as toluene and benzene are preferred.

The organic transition metal compound employed in the present invention contains a transition metal which serves as a catalyst during thermal decomposition of an organic compound. Examples of the transition metal contained in the organic transition metal compound include metal elements of Groups 4 to 10 in the periodic table. Particularly preferred are compounds such as ferrocene or nickelocene.

The vapor grown carbon fiber is produced by mixing the aforementioned organic compound and the aforementioned organic transition metal compound with a reducing gas such as hydrogen and feeding the mixture into a reactor furnace which is heated at 800 to 1,300° C., thereby causing thermal decomposition.

The thus-produced vapor grown carbon fiber may be hollow along the fiber axis, or the fiber may be branched. In order to increase compatibility of the fiber to a matrix resin, the vapor grown carbon fiber is preferably baked through heat treatment in an inert atmosphere at 900 to 1,300° C., thereby removing an organic substance such as tar which has adhered onto the fiber during a production step. Particularly, in order to enhance the intrinsic conductivity of the vapor grown carbon fiber, the vapor grown carbon fiber is preferably further heat-treated in an inert atmosphere at 2,000 to 3,500° C., thereby growing graphite crystals contained in the vapor grown carbon fiber. When the vapor grown carbon fiber is optionally heat-treated, the fiber may be pressed and molded into a solid compact (e.g., a columnar compact).

No particular limitation is imposed on the furnace for heat treatment of the compact, and any furnace such as a typical Acheson-type furnace, a resistance furnace, or a high-frequency furnace may be employed, so long as the furnace can maintain a target temperature of 2,000° C. or higher, preferably 2,300° C. or higher. Alternatively, the compact may be heated through direct passage of electricity. After completion of heating, the compact is lightly crushed or pulverized, to thereby provide finely divided carbon fiber products (outer fiber diameter: 80 to 500 nm, aspect ratio: 40 to 1,000: and BET specific surface area: 4 to 30 $m^2/g$).

The atmosphere where the aforementioned heat treatment is performed at 2,000° C. or higher is a non-oxidizing atmosphere, preferably a rare gas atmosphere containing one or more species selected from among argon, helium, neon, etc. The time for heat treatment is preferably as short as possible, from the viewpoint of productivity. When the carbon fibers are heated for a long period of time, the fiber is sintered to be solidified, thereby lowering production yield. Thus, after the temperature in the core part of the compact has reached the target temperature, the compact may be maintained at the temperature for one hour or shorter in order to fully attain the object.

It is preferable that the thus-produced carbon fiber be subjected to surface treatment to thereby reduce the surface energy. Use of vapor grown carbon fiber with a small surface energy enables a great enhancement in fluidity of the matrix resin at the time of kneading and molding steps, which leads to reduction in the shear rate, so that the electrically conductive network may be maintained.

Specifically, the surface energy of the vapor grown carbon fiber is preferably 115 $mJ/m^2$ or less. Use of vapor grown carbon fiber with the surface energy exceeding 115 $mJ/m^2$ can neither allow reduction in the addition amount of the vapor grown carbon fiber nor achieve improvement of fluidity. The surface energy of the vapor grown carbon fiber is preferably 20 to 115 $mJ/m^2$, more preferably 30 to 110 $mJ/m^2$, still more preferably 40 to 100 $mJ/m^2$.

Measurement of the surface energy is conducted using reverse phase chromatography. The measurement method is specifically described in Nippon Gomu Kyokaishi Vol. 67, No. 11, pages 752-759 (1994) published by THE SOCIETY OF RUBBER INDUSTRY, JAPAN.

Generally, treatment methods for reducing the surface energy of the vapor grown carbon fiber may be classified into dry method (e.g., discharge treatment or actinic ray treatment) or wet method (e.g., chemical treatment, polymer-coating, or grafting in the presence of a catalyst). Of these, a dry method is preferred, from the viewpoint of simplicity, post treatment, productivity, environmental problems, etc.

Specific examples of the surface treatment method for reducing the surface energy include direct fluorination, fluorination through chemical vapor deposition (CVD) (plasma, photo-, or laser), boron addition treatment, and silylation.

(1) Fluorination

Direct Fluorination

Fluorine is an atom characterized by its remarkably strong electro-negativity and its size which is the second smallest to hydrogen and its remarkably high reactivity. Thus, carbon fiber can be directly fluorinated by use of fluorine gas. In order to control reactivity, fluorine gas is generally diluted with an inert gas such as nitrogen or helium to a concentration of about 0.1 to 5%. Appropriate temperature control is also critical, and reaction is generally performed at room temperature or lower.

Fluorination Through CVD (Plasma, Photo, or Laser)

CVD (chemical vapor deposition) refers to a deposition process in which a substance present in a gas phase is reacted to deposit as a solid substance. Herein, fluorination through a widely used plasma CVD technique will be described.

Examples of the plasma apparatus which can be employed include DC plasma, low-frequency plasma, high-frequency plasma, pulse wave plasma, tri-electrode plasma, microwave plasma, downstream plasma, and columnar plasma apparatuses. In addition, an atmospheric plasma apparatus, which has been recently developed and attracting attention for its easiness of operation, is a useful apparatus.

Surface treatment by fluorination by means of a plasma apparatus can be attained by exposing VGCF to a plasma inert gas atmosphere and treating the surface with any of the following treatment gases.

Examples of the treatment gas employable for fluorination in the CVD technique include hexafluoroacetone, $C_2F_6$, $C_2F_4$, $SF_6$, $CF_4$, $CF_2Cl_2$, $CF_3H$, $NF_3$, and fluorine-containing monomers having an F/C ratio of 1.5 or higher.

No particular limitation is imposed on the excitation source, and in place of plasma, an excimer beam or laser treatment may also be employed.

(2) Boron Addition Treatment

Boron addition treatment accelerates crystallization of carbon fiber to reduce the surface energy of the carbon fiber, and to elevate conductivity of the carbon fiber. For example, the treatment may be performed by a method where boric compound such as boron carbide ($B_4C$), boron oxide ($B_2O_3$), boron in elemental state, boric acid ($H_3BO_3$) or boric acid salt is mixed in the carbon fiber at the time of heat treatment of 2,000° C. to 3,500° C. under an inert atmosphere of preferably one or more rare gases of argon, helium and neon.

The boron content added into the carbon fiber, which depends on chemical properties and physical properties of the boric compound, is not limited. For example, in a case where boron carbide ($B_4C$) is used, the content is within a range of 0.05 to 10 mass %, preferably 0.1 to 5 mass % in the amount of the carbon fiber after pulverization.

When the heat treatment is performed in the presence of a boron compound, the crystallinity of carbon in the carbon fiber increases, thereby elevating conductivity. The boron content in the crystals of carbon fiber or on the crystal surface is preferably 0.01 to 5 mass %. In order to enhance conductivity of the carbon fiber and affinity of the carbon fiber with respect to the resin, the boron content is more preferably 0.1 mass % or more. Meanwhile, the amount of boron which substitutes carbon atoms forming a graphene sheet (carbon hexagonal network plane) is approximately 3 mass %. Thus, when the boron content is higher than that amount, particularly 5 mass % or higher, the excess boron remains in the form of boron carbide or boron oxide, which may lower conductivity and is not preferred.

(3) Silylation Treatment

Examples of the treatment gas employable for silylation in the CVD technique include hexamethyldisilane, dimethylaminotrimethylsilane, and tetramethylsilane.

In order to enhance affinity of the vapor grown carbon fiber with respect to the matrix polymer, vapor grown carbon fiber may be oxidized, thereby introducing a phenolic hydroxyl group, a carboxyl group, a quinone group or a lactone group on the surface of the carbon fiber.

Alternatively, the vapor grown carbon fiber may be surface-treated with, for example, a coupling agent (titanate-base, aluminum-base, or phosphate ester-base).

The vapor grown carbon fiber employed in the present invention has an outer fiber diameter of 80 to 500 nm, preferably 90 to 250 nm, more preferably 100 to 200 nm. When the outer fiber diameter is smaller than 80 nm, the surface energy per unit volume exponentially increases, whereby cohesive force among fiber fragments is drastically elevated. The thus-aggregated vapor grown carbon fiber is difficult to disperse in a resin through routine kneading with resin, and fiber aggregates are locally present in the resin matrix, resulting in failure to form a conductive network. When great shear force is applied to a resin mixture during kneading so as to attain good dispersion of carbon fiber, aggregated carbon fiber is broken, and the formed fragments can be dispersed in the resin. However, cutting and rupture of the carbon fiber proceed upon breaking of the aggregates, resulting in failure to attain a desired conductivity.

The vapor grown carbon fiber has an aspect ratio of 40 to 1,000, preferably 50 to 800, more preferably 60 to 500, and particularly preferably 60 to 200.

When the aspect ratio (i.e., fiber length) increases, fiber filaments are entangled together, and the thus-formed mass is difficult to be disentangled, resulting in insufficient dispersion, whereas when the aspect ratio is less than 40, a large amount of filler must be incorporated into a resin so as to form a conductive network structure, leading to remarkable decrease in fluidity and tensile strength of the resin, and both cases are not preferred.

The vapor grown carbon fiber has a BET specific surface area of 4 to 30 $m^2/g$, preferably 8 to 25 $m^2/g$, more preferably 10 to 20 $m^2/g$.

When the BET specific surface area increases, the surface energy per unit volume increases, leading to difficulty in dispersion of the carbon fiber in a resin and failure to completely cover the carbon fiber with the resin. As a result, when a composite is produced from a mixture containing such carbon fiber, electroconductivity and mechanical strength are deteriorated, which is not preferred.

The interplanar spacing $d_{002}$, as obtained through an X-ray diffraction method, is 0.345 nm or less, preferably 0.343 nm or less, more preferably 0.340 nm or less. As the interplanar spacing $d_{002}$ decreases, crystallinity of graphite increases, thereby elevating electroconductivity of the vapor grown carbon fiber, which is preferred.

The ratio (Id/Ig) is 0.1 to 2, preferably 0.15 to 1.5, more preferably 0.2 to 1, wherein Id represents a peak height of a band ranging from 1,341 to 1,349 $cm^{-1}$ and Ig represents a peak height of a band ranging from 1,570 to 1,578 $cm^{-1}$, as observed in a Raman scattering spectrum.

In order to obtain high conductivity, crystallinity of vapor grown carbon fiber is preferably high for both the fiber radius direction and the axial direction. However, when the outer fiber diameter is excessively small, interplanar spacing may fail to be reduced due to the curvature. Thus, dispersibility of vapor grown carbon fiber (formation of a conductive network) is also a key factor for forming a conductive network structure which is required to impart conductivity to a resin. Therefore, in order to regulate the dispersibility, surface area per unit volume, aspect ratio, and high crystallinity of the vapor grown carbon fiber are important parameters, and suitable values of outer fiber diameter, aspect ratio, BET specific surface area, interplanar spacing $d_{002}$ as obtained through an X-ray diffraction method, and ratio (Id/Ig) determined from a Raman scattering spectrum are to be determined.

No particular limitation is imposed on the polymer employed in the present invention, a polymer in a state of a melt viscosity of 600 Pa·s or less at a shear rate of 100 $s^{-1}$ during kneading with vapor grown carbon fiber is used, which specifically is selected from the group consisting of thermosetting resins, photocurable resins and thermoplastic resins. The polymer may be used singly or in combination of two or more of the species.

Examples of thermosetting resins used in the present invention include polyether, polyester, polyimide, polysulfone, epoxy resin, unsaturated polyester resin, phenol resin, urethane resin, ureic resin and melamine resin.

Examples of thermoplastic resins used in the present invention include include aliphatic and alicyclic polyolefins such as polyethylene, polypropylene, polybutene, and polymethylpentene; aromatic polycarbonates; polybutylene terephthalate; polyethylene terephthalate; polyphenylene sulfide; polyamides; polyether-imides; polysulfones; polyether-sulfones; polyether-ether-ketones; acrylic resins; styrene resins; modified polyphenylene ethers; and non-olefinic polyethylene resins such as liquid crystal polyesters.

Among these resins, a resin exhibiting as low a viscosity as possible during kneading with vapor grown carbon fiber is preferred. In this connection, thermosetting resin is preferred, from the viewpoint of kneadability at low viscosity. In terms of thermoplastic resins, resins having a low melt viscosity, such as polyamides, polyesters, liquid crystal polymers, polyethylene, polypropylene, and polystyrene, are preferred.

Meanwhile, vapor grown carbon fiber is remarkably stable to temperature upon kneading and may be kneaded at high temperature. Therefore, the resin mixture can be kneaded at an elevated temperature so as to reduce viscosity of the resin, so long as the resin does not undergo deterioration, decomposition, or any adverse change in quality.

Conductive polymers may be produced through a method including kneading components by means of a customary apparatus such as an extruder or a kneader. Examples of the method for molding thermoplastic resin include press molding, extrusion, vacuum molding, blow molding, and injection molding. Examples of the method for molding thermosetting resin include transfer molding.

The energy applied to mixing (kneading) of the polymer and the vapor grown carbon fiber is 1,000 mJ/m$^3$ or less, so as to prevent cutting and localized dispersion of the vapor grown carbon fiber, preferably 50 to 1,000 mJ/m$^3$, more preferably 50 to 800 mJ/m$^3$, still more preferably 50 to 500 mJ/m$^3$.

The mixing energy is determined predominantly from the following three factors: viscosity of a composition containing a polymer and vapor grown carbon fiber at a given kneading temperature; a rotation rate of a kneader; and a kneading time. Thus, kneading is preferably performed at low viscosity and low rotation rate for a short period of time. However, when mixing is performed at 50 mJ/m$^3$ or less, variation (lack of uniformity) in concentration of vapor grown carbon fiber contained in the matrix cannot be eliminated, thereby deteriorating reliability in product characteristics, which is nor preferred. When the mixing energy is 1,000 mJ/m$^3$ or higher, diffusion, cutting, and localized dispersion of the vapor grown carbon fiber occur, resulting in failure to attain desired characteristics.

In a case where the matrix polymer is a thermosetting polymer, particularly where the polymer in a state of a melt viscosity of 200 Pa·s or less at a shear rate of 100 s$^{-1}$ is mixed, it is preferable that the mixing energy be 400 mJ/m$^3$ or less. In a case where the matrix polymer is a thermoplastic polymer, particularly where the polymer in a state of a melt viscosity of 200 to 600 Pa·s at a shear rate of 100 s$^{-1}$ is mixed, it is preferable that the mixing energy be 200 to 1,000 mJ/m$^3$.

Into the thus-produced conductive plastic composition, vapor grown carbon fiber is incorporated in an amount of 1 to 15 mass %, preferably 5 to 10 mass %, so as to attain a volume resistivity of 10 to 10$^8$ Ω·cm, preferably 10$^2$ to 10$^5$ Ω·cm.

When the vapor grown carbon fiber content is less than 1 mass %, the conductivity of the resultant plastic composition is insufficient, whereas when the content is in excess of 15 mass %, conductivity may be satisfactory, but problems such as inevitable increase in cost, decrease in plastic characteristics, and inhibition of flow of resin during extrusion or injection molding arise.

BEST MODE FOR CARRYING OUT THE INVENTION

The present invention will next be described in more detail by way of Examples and Comparative Examples.

EXAMPLES 1 TO 6 AND COMPARATIVE EXAMPLES 1 AND 2

<Methods of Measurement> i) Outer Fiber Diameter

Mean diameter (outer diameter) of the vapor grown carbon fiber was derived by observing the fiber under a scanning electron microscope (×20,000) as 30 visible images, measuring the outer fiber diameters of 300 fiber filaments by means of an image analyzer (LUZEX-AP, product of Nireco), and averaging the values.

ii) Aspect Ratio

The aspect ratio was calculated by mean fiber length/mean fiber diameter of the vapor grown carbon fiber. The mean fiber length was derived by observing the fiber under a scanning electron microscope (×2,000) as 30 visible images and measuring the fiber diameters of 300 fiber filaments by means of an image analyzer.

iii) BET Specific Surface Area

BET specific surface area was determined through a nitrogen gas adsorption method (by means of NOVA 1000, product of Yuasa Ionics Inc.).

iv) $d_{002}$ Value Determined Through X-ray Diffraction Method $d_{002}$ Values were determined through powder X-ray diffraction (by means of Rigaku Geigerflex) while Si was used as an internal standard.

v) Ratio (Id/Ig) Determined from a Raman Scattering Spectrum

The ratio (Id/Ig), wherein Id represents a peak height of a band ranging from 1,341 to 1,349 cm$^{-1}$ and Ig represents a peak height of a band ranging from 1,570 to 1,578 cm$^{-1}$ as determined from a Raman scattering spectrum was determined by means of a Raman spectrometer (LabRam HR, product of Jobin Yvon).

The method for producing vapor grown carbon fiber A employed in the Examples and characteristics of carbon fiber A will be described below. Firstly, a raw material liquid was prepared by mixing benzene, ferrocene, and sulfur in proportions (by mass) of 91:7:2. The raw material liquid was fed with hydrogen serving as a carrier gas to a reaction furnace (inner diameter: 100 mm, height: 2,500 mm) heated at 1,200° C. and sprayed. The feed rates of the raw material and the hydrogen flow were adjusted to 10 g/min and 60 L/min, respectively. The reaction product (150 g) obtained through the above method was charged into a graphite crucible (inner diameter: 100 mm, height: 10 mm), baked at 1,000° C. for one hour under argon, and subsequently, graphitized at 2,800° C. for one hour under argon, to thereby produce vapor grown carbon fiber A.

The vapor grown carbon fiber A was found to have a mean fiber diameter of 150 nm, a mean fiber length of 9.0 µm, an aspect ratio of 60, a BET specific surface area of 13 m$^2$/g, a $d_{002}$ of 0.339 nm, and an Id/Ig of 0.2.

The method for producing vapor grown carbon fiber B employed in the Examples and characteristics of carbon fiber B will be described below. Firstly, a raw material liquid was prepared by mixing benzene, ferrocene, and sulfur in proportions (by mass) of 97:2:1. The raw material liquid was fed with hydrogen serving as a carrier gas to a reaction furnace (inner diameter: 100 mm, height: 2,500 mm) heated at 1,200° C. and sprayed. The feed rates of the raw material and the hydrogen flow were adjusted to 5 g/min and 90 L/min, respectively.

The reaction product (150 g) obtained through the above method was charged into a graphite crucible (inner diameter: 100 mm, height: 150 mm), baked at 1,000° C. for one hour under argon, and subsequently, graphitized at 2,800° C. for one hour under argon, to thereby produce vapor grown carbon fiber B.

The vapor grown carbon fiber B was found to have a mean fiber diameter of 80 nm, a mean fiber length of 12.0 μm, an aspect ratio of 150, a BET specific surface area of 25 μm²/g, a $d_{002}$ of 0.340 nm, and an Id/Ig of 0.14.

The method for producing vapor grown carbon fiber C employed in the Examples and characteristics of carbon fiber C will be described below. Firstly, a raw material liquid was prepared by mixing benzene, ferrocene, and sulfur in proportions (by mass) of 92:6:2. The raw material liquid was heated and vaporized by using a 300° C.-evaporator. Thus prepared raw material gas was fed with hydrogen serving as a carrier gas to a reaction furnace (inner diameter: 100 mm, height: 2,500 mm) heated at 1,200° C. The feed rates of the raw material and the hydrogen flow were adjusted to 8 g/min and 60 L/min, respectively. The reaction product (150 g) obtained through the above method was charged into a graphite crucible (inner diameter: 100 mm, height: 150 mm), baked at 1,000° C. for one hour under argon, and subsequently, graphitized at 2,800° C. for one hour under argon, to thereby produce vapor grown carbon fiber C (hereinafter, sometimes referred to as "VGCF-S").

The vapor grown carbon fiber C(VGCF-S) was found to have a mean fiber diameter of 100 nm, a mean fiber length of 13.0 μm, an aspect ratio of 130, a BET specific surface area of 20 m²/g, a $d_{002}$ of 0.340 nm, and an Id/Ig of 0.14.

Method for Evaluating Polymer

With respect to the volume resistivity of $10^8$ Ω·cm or less of each resin composition, measurement was performed through the four-probe method (by means of Loresta HP MCP-T410, product of Mitsubishi Chemical Industries, Ltd.) and With respect to the volume resistivity of $10^8$ Ω·cm or more, measurement was performed by use of an insulation resistance tester (ultra-high resistance/micro current meter R8340, product of ADVANTEST).

Each molded product of the conductive polymer was fired at 1,000° C. for 30 minutes under argon, thereby collecting vapor grown carbon fiber. The thus-collected vapor grown carbon fiber was observed under a scanning electron microscope, and an average fiber length was derived through image analysis, whereby the degree of fiber cutting due to kneading was evaluated.

The viscosity (fluidity) of the matrix polymer and composition was measured by using a Capirograph (a capillary type rheometer).

EXAMPLE 1

Polypropylene resin (Sun-Allomer PWB02N (MFI: 70), product of SunAllomer Ltd.) (90 mass %) and vapor grown carbon fiber A (10 mass %) were melt-kneaded by means of Laboplast mill R100 (product of Toyo Seiki Seisakusho, Ltd.) at 200° C. and 40 rpm for 5 minutes (kneading energy: 200 mJ/m³). The kneaded product was molded by means of a 50-ton thermal molding apparatus (product of Nippo Engineering) at 200° C. and 200 kgf/cm² for 30 seconds, to thereby produce 10 mm×10 mm×2 mm t plate samples. The matrix resin had a melt viscosity of 100 Pa·s at a shear rate of 100 $s^{-3}$ at a temperature of 200° C.

EXAMPLE 2

Polyamide 6 resin (Novamid 1010, product of Mitsubishi Chemical Industries, Ltd.) (90 mass %) and vapor grown carbon fiber A (10 mass %) were melt-kneaded by means of Laboplast mill R100 (product of Toyo Seiki Seisakusho, Ltd.) at 260° C. and 40 rpm for 10 minutes (kneading energy: 500 mJ/m³). The kneaded product was molded by means of a 50-ton thermal molding apparatus (product of Nippo Engineering) at 200° C. and 200 kgf/cm² for 30 seconds, to thereby produce 10 mm×10 mm×2 mm t plate samples. The matrix resin had a melt viscosity of 80 Pa·s at a shear rate of 100 $s^{-1}$ at a temperature of 260° C.

EXAMPLE 3

Polypropylene resin (Sun-Allomer PWB02N (MFI: 70), product of SunAllomer Ltd.) (54 mass %), polyethylene resin (J-Rex HD KMA90K (MFI: 30), product of Japan Polyolefins Co., Ltd.) (46 mass %), and vapor grown carbon fiber A (10 mass %) were melt-kneaded by means of Laboplast mill R100 (product of Toyo Seiki Seisakusho, Ltd.) at 180° C. and 40 rpm for 5 minutes (kneading energy: 180 mJ/m³). The kneaded product was molded by means of a 50-ton thermal molding apparatus (product of Nippo Engineering) at 200° C. and 200 kgf/cm² for 30 seconds, to thereby produce 10 mm×10 mm×2 mm t plate samples. The matrix resin had a melt viscosity of 150 Pa·s at a shear rate of 100 $s^{-1}$ at a temperature of 180° C.

EXAMPLE 4

Polypropylene resin (Sun-Allomer PWB02N (MFI: 70), product of SunAllomer Ltd.) (95 mass %) and vapor grown carbon fiber B (5 mass %) were melt-kneaded by means of Laboplast mill R100 (product of Toyo Seiki) at 200° C. and 40 rpm for 5 minutes (kneading energy: 150 mJ/m³). The kneaded product was molded by means of a 50-ton thermal molding apparatus (product of Nippo Engineering) at 200° C. and 200 kgf/cm² for 30 seconds, to thereby produce 10 mm×10 mm×2 mm t plate samples. The matrix resin had a melt viscosity of 100 Pa·s at a shear rate of 100 $s^{-1}$ at a temperature of 200° C.

EXAMPLE 5

Epoxy resin (EPICLON HP-7200, product of Dainippon Ink and Chemicals, Inc.) (90 mass %) and vapor grown carbon fiber A (10 mass %) were melt-kneaded by means of Laboplast mill R100 (product of Toyo Seiki Seisakusho, Ltd.) at 80° C. and 40 rpm for 5 minutes (kneading energy: 100 mJ/m³). The kneaded product was molded by means of a 50-ton thermal molding apparatus (product of Nippo Engineering) at 175° C. and 100 kgf/cm² for 5 hours, to thereby produce 10 mm×10 mm×2 mm t plate samples. The matrix resin had a melt viscosity of 30 Pa·s at a shear rate of 100 $s^{-1}$ at a temperature of 80° C.

EXAMPLE 6

Polypropylene resin (Sun-Allomer PWB02N, product of SunAllomer Ltd.) (95 mass %) and vapor grown carbon fiber C (5 mass %) were melt-kneaded by means of Laboplast mill R100 (product of Toyo Seiki Seisakusho, Ltd.) at 200° C. and 40 rpm for 5 minutes (kneading energy: 150 mJ/m$^3$). The kneaded product was molded by means of a 50-ton thermal molding apparatus (product of Nippo Engineering) at 200° C. and 200 kgf/cm$^2$ for 30 seconds, to thereby produce 10 mm×10 mm×2 mm t plate samples. The matrix resin had a melt viscosity of 100 Pa·s at a shear rate of 100 s$^{-1}$ at a temperature of 200° C.

COMPARATIVE EXAMPLE 1

Polypropylene resin (Sun-Allomer PWB02N (MFI: 70), product of SunAllomer Ltd.) (90 mass %) and vapor grown carbon fiber A (10 mass %) were melt-kneaded by means of Laboplast mill R100 (product of Toyo Seiki Seisakusho, Ltd.) at 180° C. and 40 rpm for 20 minutes (kneading energy: 1,100 mJ/m$^3$). The kneaded product was molded by means of a 50-ton thermal molding apparatus (product of Nippo Engineering) at 200° C. and 200 kgf/cm$^2$ for 30 seconds, to thereby produce 10 mm×10 mm×2 mm t plate samples. The matrix resin had a melt viscosity of 150 Pa·s at a shear rate of 100 s$^{-1}$ at a temperature of 180° C.

COMPARATIVE EXAMPLE 2

Polypropylene resin (Sun-Allomer PWB02N (MFI: 70), product of SunAllomer Ltd.) (90 mass %) and vapor grown carbon fiber A (10 mass %) were melt-kneaded by means of Laboplast mill R100 (product of Toyo Seiki Seisakusho, Ltd.) at 170° C. and 80 rpm for 20 minutes (kneading energy: 3,000 mJ/m$^3$). The kneaded product was molded by means of a 50-ton thermal molding apparatus (product of Nippo Engineering) at 200° C. and 200 kgf/cm$^2$ for 30 seconds, to thereby produce 10 mm×10 mm×2 mm t plate samples. The matrix resin had a melt viscosity of 180 Pa·s at a shear rate of 100 s$^{-1}$ at a temperature of 170° C.

The results of Examples 1 to 6 and Comparative Examples 1 and 2 are shown in Table 1.

TABLE 1

| | Raw material resin | Kneading energy (mJ/m$^3$) | Type of VGCF | Amount mass % | Volume resistivity (Ω·cm) | Mean length of collected fiber (μm) |
|---|---|---|---|---|---|---|
| Ex. 1 | PP*$^1$ | 200 | A | 10 | 9.5 × 10$^2$ | 8.8 |
| Ex. 2 | PA6*$^2$ | 500 | A | 10 | 3.9 × 10$^5$ | 8.5 |
| Ex. 3 | PP/PE*$^3$ | 180 | A | 10 | 1.0 × 10$^2$ | 8.8 |
| Ex. 4 | PP | 150 | B | 5 | 1.1 × 10$^2$ | 11.8 |
| Ex. 5 | Epoxy*$^4$ | 100 | A | 10 | 8.4 × 10$^2$ | 8.7 |
| Ex. 6 | PP | 150 | C | 5 | 2.0 × 10$^2$ | 12.5 |
| Comp. Ex. 1 | PP | 1,100 | A | 10 | 1.5 × 10$^{10}$ | 7.3 |
| Comp. Ex. 2 | PP | 3,000 | A | 10 | 4.2 × 10$^{15}$ | 6.5 |

*$^1$Polypropylene (Sun-Allomer PB02N, product of SunAllomer Ltd.)
*$^2$Polyamide 6 (Novamid 1010, product of Mitsubishi Chemical Industries, Ltd.)
*$^3$A mixture of polypropylene (Sun-Allomer PB02N, product of SunAllomer Ltd.) (54 mass %) and polyethylene (J-Rex HD KMA90K, product of Japan Polyethylene Co., Ltd.) (46 mass %)
*$^4$Epoxy resin (EPICLON HP-7200, product of Dainippon Ink and Chemicals, Inc.)

EXAMPLES 7 TO 14 AND COMPARATIVE EXAMPLES 3 TO 8 VGCF

As vapor grown carbon fiber, VGCF (registered trademark) (product of Showa Denko K.K., average fiber diameter:150 nm, average fiber length:9 μm, aspect ratio:60, BET specific surface area:13 m$^2$/g, $d_{002}$=0.339 nm, and Id/Ig=0.2) was used. The same VGCF was also employed in surface treatment.

VGCF-S

As vapor grown carbon fiber, VGCF-S (average fiber diameter:100 nm, average fiber length:13 μm, aspect ratio:130, BET specific surface area:20 m$^2$/g, $d_{002}$=0.340 nm, and Id/Ig=0.14) was used. The same VGCF-S was also employed in surface treatment.

Surface Treatment Method (1) Fluorination Treatment

A plasma powder treatment device (product of Samco International Kenkyusho) was employed.

In a sample flask where plasma was to be generated, vapor grown carbon fiber was placed together with argon serving as a carrier gas and CF$_4$ serving as a reactive gas, and the gas pressure was adjusted to 1 Torr. The vapor carbon grown fiber was surface-treated in the flask by means of a high-frequency power source of a frequency of 13.54 MHz at a discharge power of 200 W for 60 seconds.

(2) Boron Addition Treatment

B$_4$C powder (mean particle size: 15 μm) (120 g) was added to vapor grown carbon fiber (2.88 kg), and the mixture was sufficiently mixed by means of a Henschel mixer. The mixture was charged into a cylindrical graphite crucible (volume: 50 L) and pressed, thereby adjusting the bulk density to 0.07 g/cm$^3$. The crucible was closed with a lid while the compact was pressurized with a graphite pressure sheet and transferred to an Acheson-type furnace for heat treatment. The heat treatment temperature was 2,900° C., and the treatment was continued at the temperature for 60 minutes. After completion of heat treatment and subsequent cooling, the treated vapor grown carbon fiber was removed from the crucible and pulverized by means of a Bantam mill. Non-fibrous matter was removed by means of an air classifier. The fiber diameter of the thus-obtained fiber remained unchanged through treatment.

(3) Silylation Treatment

A plasma powder treatment device (product of Samco International Kenkyusho) was employed.

Vapor grown carbon fiber was placed in a sample flask together with argon serving as a carrier gas and tetramethylsilane serving as a reactive gas and the gas pressure was adjusted to 1 Torr. The vapor grown carbon fiber was surface-treated in the flask by means of a high-frequency power source of a frequency of 13.54 MHz at a discharge power of 200 W for 60 seconds (gas pressure: 1 Torr).

Determination of Surface Energy

Measurement of the surface energy was conducted using reverse phase chromatography as described in Nippon Gomu Kyokaishi Vol. 67, No. 11, pages 752-759 (1994) published by THE SOCIETY OF RUBBER INDUSTRY, JAPAN. According to this method, surface free energy (surface tension) can be measured regardless of the shape of the samples in a relatively simple manner and high precision in measurement can be attained. Specifically, the measurement was performed as follows.

Each of vapor grown carbon fiber samples serving as an adsorption phase was charged into a glass column (inner diameter: 3 mm, length: 2.1 m). Measurement was carrier out by use of a gas chromatograph GC-7A (detector: TCD) (product of Shimadzu Corporation) with helium serving as a carrier gas at a column temperature of 90° C. in order to evaluate dispersion performance, each of n-alkane:pentane, hexane, and heptane was employed as a probe. In order to evaluate polarity, each of benzene and tetrahydrofuran was employed as a basic solution, and each of dichloromethane and chloroform was employed as an acidic solution.

Table 2 shows measurement results of surface energy values of vapor grown carbon fiber and surface-treated vapor grown carbon fiber.

TABLE 2

Surface energy of carbon fiber and surface-treated carbon fiber

| Type of carbon fiber | Surface energy (mJ/m$^2$) |
|---|---|
| VGCF | 119 |
| Boron-treated VGCF | 98 |
| Fluorinated VGCF | 85 |
| Silylated VGCF | 90 |
| VGCF-S | 120 |
| Fluorinated VGCF-S | 84 |

Kneading Method

Laboplast mill (volume: 100 ml) (product of Toyo Seiki) was employed as a kneader.

Generally, Laboplast mill is employed for assessing processing characteristics of a polymer such as thermoplastic resin, thermosetting resin, or elastomer on the basis of a mixing test.

In a sample kneading portion of the heated mixer, two kneading blades, which are rotatable in directions different from each other at different rotating ratios, and a resin temperature detector are provided.

The resin fed to the mixer is kneaded by accepting shear, and melting of the resin and dispersion of the filler occur as kneading proceeds depending on the characteristics of the resin and filler. The feature of melting and dispersing can be detected as a torque applied to the blades. When a resin having a high melt viscosity is used, a considerably high torque; i.e., high shear stress, is applied to the mixture, thereby uniformly dispersing the filler.

Molding Method i) Thermoplastic Resin

Each thermoplastic resin was molded into plate pieces (100×100×2 mm) by means of an injection molding machine (Sicap, clamping force 75 tons, product of Sumitomo Heavy Industries, Ltd.) at a cylinder temperature shown in Table 2. PP, PA6, and PPS were molded at a mold temperature of 20° C., 40° C., and 120° C., respectively.

ii) Thermosetting Resin

Each thermosetting resin was molded into plate pieces (100×100×2 mm) by means of a molding machine (M-70C-TS, product of Meiki Co., Ltd.). Allyl ester was molded at a cylinder temperature of 80° C. and a mold temperature of 160° C. for a retention time of 10 minutes.

Resins Employed i) Thermoplastic Resin

Polypropylene (PP), Products of SunAllomer Ltd.
 PM 900A (MI=30)
 PW 201N (MI=0.6)

Polyamide 6 (PA6), Product of Toray Industries, Inc.
 Amilan CM 1007

Polyphenylene sulfide (PPS), Product of Toso Corporation
 Susteel F11 ii) Thermosetting Resin

Allyl ester Resin, Product of Showa Denko K.K.
 AA 101 (viscosity: 630,000 cps (30° C.)), employed organic peroxide: dicumyl peroxide (Percumyl D, product of Nippon Oil & Fats Co., Ltd.)

Melt viscosity values (at a shear rate of 100 s$^{-1}$) of employed resins are shown in Table 3.

TABLE 3

Melt viscosity at shear rate of 100 s$^{-1}$

| Resin | Grade | Melt viscosity Pa·s | Molding temp. ° C. |
|---|---|---|---|
| PP | PM 900A | 150 | 220 |
|  | PW 201N | 1,000 | 220 |
|  |  | 600 | 280 |
| PA6 | CM 1007 | 100 | 240 |
| PPS | F11 | 200 | 320 |
| Allyl ester | AA 101 | 100 | 60 |

Evaluation of Physical Properties

Measurement of Physical Properties

Volume resistivity was determined in accordance with a four-probe method (JIS K7194).

Bending characteristics of the samples were evaluated in terms of three-point bending strength (test piece: 100×10×2 mm, span interval: 64 mm, and bending speed: 2 mm/min).

Measurement of Viscosity (Capirograph)

A Capirograph is a capillary type rheometer and is employed for measurement as stipulated in JIS K7119. Through employment of this rheometer, fluidity of each matrix polymer and each composition were determined. Table 3 shows the measurement results with respect to matrix polymers, and Tables 4 and 5 show the results with respect to resin compositions.

The results of the Examples and those of the Comparative Examples are shown in Tables 4 and 5, respectively.

TABLE 4

Results of the Examples

| Ex. | Resin, grade, molding temp. | Type of carbon fiber | amount of carbon fiber (mass %) | Vol. resistivity (Ω·cm) | Melt viscosity (Pa·s) | Bending strength (Mpa) |
|---|---|---|---|---|---|---|
| Ex. 7 | PP PM 900A 220° C. | Boron-added VGCF | 5 | 3 × 10$^0$ | 200 | 55 |

TABLE 4-continued

Results of the Examples

| Ex. | Resin, grade, molding temp. | Type of carbon fiber | amount of carbon fiber (mass %) | Vol. resistivity ($\Omega \cdot cm$) | Melt viscosity (Pa·s) | Bending strength (Mpa) |
|---|---|---|---|---|---|---|
| Ex. 8 | PP PM 900A 220° C. | Fluorinated VGCF | 5 | $4 \times 10^0$ | 180 | 52 |
| Ex. 9 | PP PM 900A 220° C. | Silylated VGCF | 5 | $1 \times 10^1$ | 190 | 50 |
| Ex. 10 | PP PW 201N 280° C. | Boron-added VGCF | 5 | $5 \times 10^2$ | 550 | 50 |
| Ex. 11 | PA6 CM 1007 240° C. | Fluorinated VGCF | 10 | $2 \times 10^2$ | 200 | 120 |
| Ex. 12 | PPS F11 320° C. | Boron-added VGCF | 10 | $1 \times 10^0$ | 300 | 75 |
| Ex. 13 | Allyl ester AA 101 60° C. | Silylated VGCF | 5 | $2 \times 10^2$ | 150 | 80 |
| Ex. 14 | PP PM900A 220° C. | Fluorinated VGCF-S | 2 | $3 \times 10^1$ | 180 | 50 |

TABLE 5

Results of the Comparative Examples

| Comp. Ex. | Resin, grade, molding temp. | Type of carbon fiber | amount of carbon fiber (mass %) | Vol. resistivity ($\Omega \cdot cm$) | Melt viscosity (Pa·s) | Bending strength (Mpa) |
|---|---|---|---|---|---|---|
| Comp. Ex. 3 | PP PM 900A 220° C. | VGCF | 5 | $3 \times 10^{10}$ | 250 | 50 |
| Comp. Ex. 4 | PP PW 201N 220° C. | B-added VGCF | 10 | $5 \times 10^{15}$ | 1,100 | 50 |
| Comp. Ex. 5 | PA6 CM 1007 240° C. | VGCF | 10 | $1 \times 10^{12}$ | 300 | 100 |
| Comp. Ex. 6 | PPS F11 320° C. | VGCF | 10 | $5 \times 10^8$ | 400 | 60 |
| Comp. Ex. 7 | Allyl ester AA 101 60° C. | VGCF | 5 | $3 \times 10^{12}$ | 200 | 70 |
| Comp. Ex. 8 | PP PW210N 220° C. | VGCF-S | 2 | $3 \times 10^4$ | 1100 | 45 |

Table 6 shows threshold values of various vapor grown carbon fibers at different molding temperature.

When a composite material containing polypropylene (PM 900A) and VGCF was molded at 220° C., the threshold value was found to be 7%. In other words, high conductivity was obtained (conductive network was formed) when the amount of VGCF added reached 7%. When a modified VGCF (boron-added, fluorinated, or silylated) whose surface energy had been lowered was used, the threshold value was reduced to 3%, exhibiting the effect of the invention.

When a composite material containing polypropylene (PW 201N) and boron-added VGCF was molded at 220° C., a conductive network was broken due to high melt viscosity, thereby elevating the threshold value to 15%. However, when the molding temperature was elevated, the threshold value could be reduced to 4% by virtue of lowered melt viscosity.

When a composite material containing polyamide 6 and VGCF was molded at 240° C., the threshold value was found to be 13%. However, when fluorinated VGCF was used, the threshold value was reduced to 8%, exhibiting the effect of reduced surface energy.

When a composite material containing polyphenylene sulfide and VGCF was molded at 320° C., the threshold value was found to be 10%. However, when boron-added VGCF was used, the threshold value was reduced to 7%.

In the case of a composite material containing a thermosetting allyl ester and VGCF, the threshold value was found to be 8%. However, when silylated VGCF was used, the threshold value was reduced to 3%, exhibiting the effect of reduced surface energy on VGCF.

When a composite material containing polypropylene (PW210N) and VGCF-S was molded at 220° C., the threshold value was found to be 3%. However, when a fluorinated VGCF-S having a reduced surface energy was used, the threshold value was reduced to 1.5%, which showed that use of such a fluorinated VGCF-S was effective.

TABLE 6

Type of vapor grown carbon fiber, molding temperature, and threshold values of resins

| Type of carbon fiber | Resin, grade | Molding temp. | Threshold value |
|---|---|---|---|
| VGCF | PP, PM 900A | 220° C. | 7% |
| B-added VGCF | PP, PM 900A | 220° C. | 3% |
| Fluorinated VGCF | PP, PM 900A | 220° C. | 3% |
| Silylated VGCF | PP, PM 900A | 220° C. | 3% |
| B-added VGCF | PP, PW 201N | 220° C. | 15% |
| B-added VGCF | PP, PW 201N | 280° C. | 4% |
| VGCF | PA6, CM 1007 | 240° C. | 13% |
| Fluorinated VGCF | PA6, CM 1007 | 240° C. | 8% |
| VGCF | PPS, F11 | 320° C. | 10% |
| B-added VGCF | PPS, F11 | 320° C. | 7% |
| VGCF | Allyl ester, AA 101 | 60° C. | 8% |
| Silylated VGCF | Allyl ester, AA 101 | 60° C. | 3% |
| VGCF-S | PP PW201N | 220° C. | 3% |
| VGCF-S | PP PW201N | 220° C. | 1.5% |

INDUSTRIAL APPLICABILITY

The conductive polymer of the present invention uses as a conductivity imparting agent, a vapor grown carbon fiber which is excellent in economical efficiency and a mass supply of which is available. In the conductive polymer, cutting of vapor grown carbon fiber can be reduced through the control of kneading energy at the time of kneading matrix polymer and the vapor grown carbon fiber and thus a conductive network structure is formed and maintained, as a result, the polymer obtained by incorporating a small amount of vapor grown carbon fiber can exhibit excellent conductivity. Therefore, the polymer maintains its intrinsic fluidity and provides excellent molded products. In addition, since the vapor grown carbon fiber is added only in a small amount, decrease in mechanical strength can be suppressed to a minimum level, thereby providing products of high reliability.

The conductive polymer of the present invention, which is excellent in electric properties such as conductivity and antistatic property, and further in surface smoothness, dimension precision, glossiness, mechanical strength, coatability, heat stability and impact resistance, is useful in many industrial fields, such as the field of material for shipping or wrapping electronic components, the field of components of office automation (OA) apparatus and electronic apparatus and the field of antistatic coating material for automobile.

The invention claimed is:

1. A method for producing a conductive polymer, comprising a step of blending a polymer in a state of a melt viscosity of 600 Pa·s or less at a shear rate of 100 s$^{-1}$ with a vapor grown carbon fiber in an amount of 1 to 15 mass %, at a mixing energy of 1,000 mJ/m$^3$ or less, wherein said step of blending comprises melt kneading at 80° C. to 260° C.

2. The method for producing a conductive polymer as claimed in claim 1, wherein the polymer is an uncured thermosetting polymer in a state of a melt viscosity of 200 Pa·s or less at a shear rate of 100 s$^{-1}$ and the blending is performed at a mixing energy of 400 mJ/m$^3$ or less.

3. The method for producing a conductive polymer as claimed in claim 1, wherein the polymer is a thermoplastic polymer in a state of a melt viscosity of 200 to 600 Pa·s at a shear rate of 100 s$^{-1}$ and the blending is performed at a mixing energy of 200 to 1,000 mJ/m$^3$.

4. The method for producing a conductive polymer as claimed in claim 1, wherein the vapor grown carbon fiber has an outer fiber diameter of 80 to 500 nm, an aspect ratio of 40 to 1,000, a BET specific surface area of 4 to 30 m$_2$/g, a d$^{002}$ of 0.345 nm or less as obtained through an X-ray diffraction method, and a ratio (Id/Ig) of 0.1 to 2, wherein Id represents a peak height of a band ranging from 1,341 to 1,349 cm$^{-1}$ and Ig represents a peak height of a band ranging from 1,570 to 1,578 cm$^{-1}$, as observed in a Raman scattering spectrum.

5. The method for producing a conductive polymer as claimed in claim 1, wherein the vapor grown carbon fiber has been heat-treated at 2,000 to 3,500° C. in an inert atmosphere.

6. The method for producing a conductive polymer as claimed in claim 1, wherein the vapor grown carbon fiber has a surface energy of 115 mJ/m$^2$ or less.

7. The method for producing a conductive polymer as claimed in claim 6, wherein the vapor grown carbon fiber has been subjected to treatment for lowering the surface energy by wet- or dry-method.

8. The method for producing a conductive polymer as claimed in claim 7, wherein the treatment for lowering the surface energy is fluorination treatment, boron addition treatment or silylation treatment.

9. The method for producing a conductive polymer as claimed in claim 2, wherein the thermosetting polymer is selected from the group consisting of polyether, polyester, polyimide, polysulfone, epoxy resin, unsaturated polyester resin, phenol resin, urethane resin, urea resin and melamine resin.

10. The method for producing a conductive polymer as claimed in claim 3, wherein the thermoplastic polymer is selected from the group consisting of polyamide, polyester, liquid crystal polymer, polyethylene, polypropylene, polyphenylene sulfide and polystyrene.

11. A method for producing a conductive polymer, comprising a step of blending a polymer in a state of a melt viscosity of 600 Pa·s or less at a shear rate of 100 s$^{-1}$ with a vapor grown carbon fiber having a surface energy of 115 mJ/m$^2$, at a mixing energy of 1,000 mJ/m$^3$ or less, wherein said step of blending comprises melt kneading at 80° C. to 260° C.

12. The method for producing a conductive polymer as claimed in claim 11, wherein the polymer is at least one selected from thermoplastic resins and thermosetting resins being in uncured state.

13. The method for producing a conductive polymer as claimed in claim 11, wherein the vapor grown carbon fiber has been subjected to treatment for lowering the surface energy by wet- or dry-method.

14. The method for producing a conductive polymer as claimed in claim 11, wherein the vapor grown carbon fiber has an average fiber diameter of 5 μm or less.

15. The method for producing a conductive polymer as claimed in claim 13, wherein the treatment for lowering the surface energy is fluorination treatment, boron addition treatment or silylation treatment.

* * * * *